Feb. 27, 1934.    G. H. KOCH    1,948,763
WELDING APPARATUS
Filed Dec. 19, 1930    2 Sheets-Sheet 2

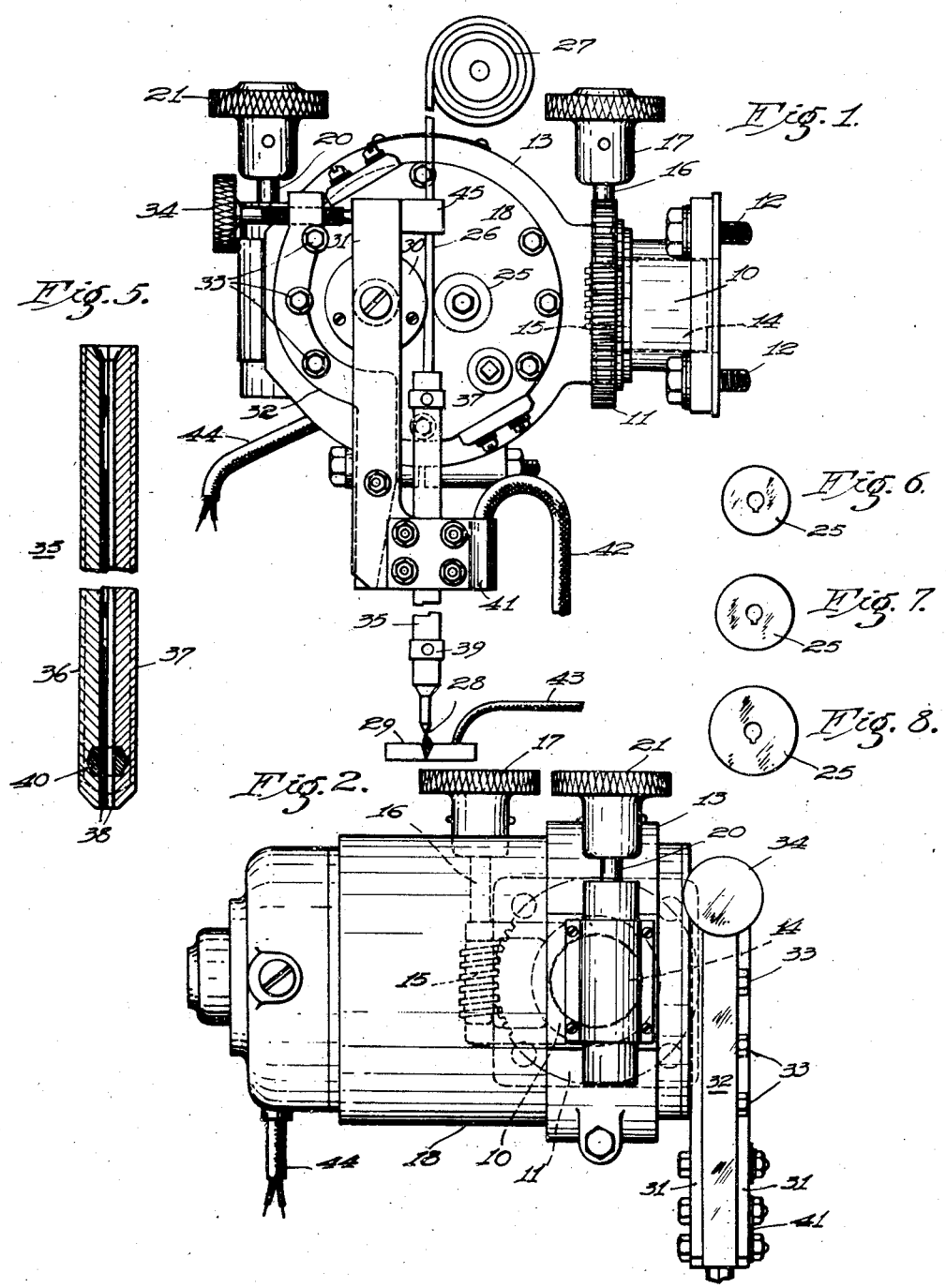

INVENTOR
Gustav H. Koch.
BY
ATTORNEY

Patented Feb. 27, 1934

1,948,763

UNITED STATES PATENT OFFICE 1,948,763

WELDING APPARATUS

Gustav H. Koch, Wilkinsburg, Pa., assignor to Westinghouse Electric & Manufacturing Company, a corporation of Pennsylvania Application December 19, 1930
Serial No. 503,402

17 Claims. (Cl. 219—8)

My invention relates to arc welding apparatus and it has particular relation to welding heads for feeding electrodes to perform welding operations.

An object of my invention is to provide a welding head for operation in either a right or a left-hand position.

Another object of my invention is to provide a welding head having a nozzle that will not be readily abraded by the welding electrode.

Still another object of my invention is to provide a welding head for feeding an electrode at any desired angle to perform the welding operation.

The principal object of my invention is to provide a welding head which will be adapted to utilize welding electrodes and feeding rollers of various sizes.

Another object of my invention is to provide a welding head which will be adaptable for feeding a welding electrode at different rates to perform a welding operation.

Other objects of my invention will become evident from the following detailed description, taken in conjunction with the accompanying drawings in which:

Figure 1 is an end view of a welding head embodying my invention.

Fig. 2 is a side view of the welding head shown in Fig. 1.

Fig. 5 is an enlarged sectional view of the welding nozzle illustrated in Fig. 1, and, Figs. 6, 7 and 8 are detail views of feeding rollers of different sizes.

Figure 3:
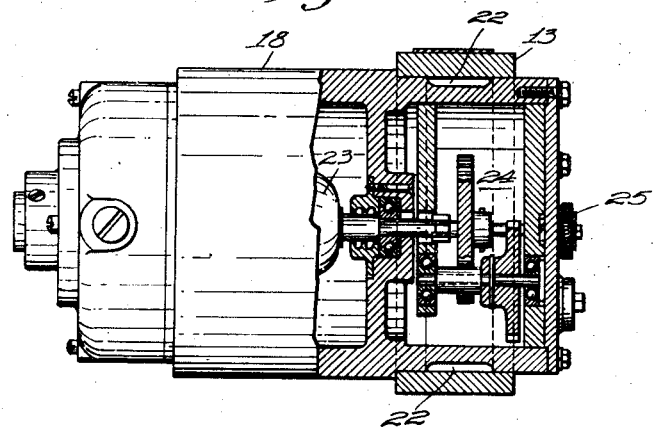
Fig. 3 is a view, partially in side elevation and partially in section, taken along the lines III—III of Fig. 4, showing the arrangement of the motor and gear train.

Referring to the drawings, the welding head shown in Figs. 1 and 2 comprises a bearing 10 having worm-gear teeth 11 and adapted to be attached to a movable carriage (not shown) by bolts 12.

A tilting ring 13, having a shaft projection 14 for mounting in the bearing 10, is located as shown. In order to rotate the tilting ring 13 about its transverse axis, a worm 15 is mounted on a shaft 16 which is located on the tilting ring 13. A handwheel 17 is mounted on shaft 16 to rotate it and the worm 15 which cooperates with the gear teeth 11 on the bearing 10 to rotate the tilting ring 13.

Figure 4:
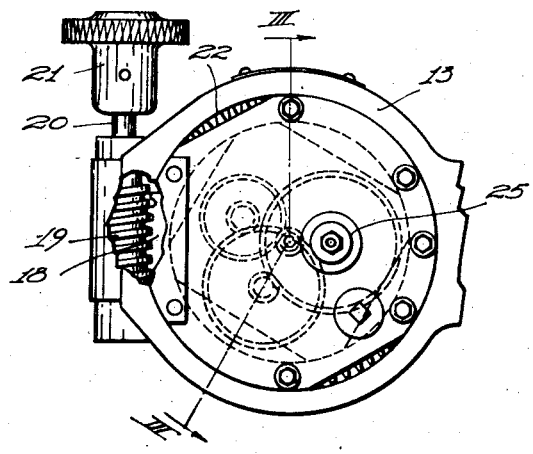
Fig. 4 is an end view, partially in section, further showing the arrangement of the gear train shown in Fig. 3.

A rotatable frame 18 (shown more clearly in Fig. 3) is mounted within the tilting ring 13. In order to rotate the frame 18 within the tilting ring 13, a worm 19 (shown more clearly in Fig. 4) is mounted on a shaft 20 which is journalled in the tilting ring 13 and is provided with a hand wheel 21 for turning it. The worm 19 cooperates with worm gear teeth 22 located on the periphery of the rotatable frame 18 and provides for turning the frame through any desired arc.

Within the frame 18 is located a motor, the armature 23 of which is connected to gearing, shown generally at 24 to turn a knurled feeding roller 25. The knurled feeding roller 25 is adapted to feed a welding electrode 26 from a reel 27 to an arc 28 to perform a welding operation on the work 29.

An idler roller 30 is mounted upon a pivoted electrode-guiding arm 31 which, in turn, is mounted upon a bracket 32 on the rotatable frame 18 by means of bolts 33. An adjusting screw 34 is located in bracket 32 to provide for varying the distance between the feeding roller 25 and idler roller 30. By this means, suitable pressure is effected between the welding electrode 26 and the feeding roller 25, and provision is made for the use of welding electrodes of different sizes and feeding rollers of different diameters, as shown in Figs. 6, 7, and 8.

Electrical contact with the welding electrode 26 is provided by means of a welding nozzle, shown generally at 35 and constructed of two parts of copper 36 and 37, having semi-cylindrical grooves 38 therein to provide for the passage of the welding electrode 26. Clamps 39 are disposed, as shown, to hold the parts 36 and 37 of the welding nozzle 35 together.

The intense heat developed at the lower part of the welding nozzle 35 by the arc 28 tends to cause the copper to become softened, and abrasion by the welding electrode tends to rapidly enlarge the grooves 38. In order to prevent such abrasion of the lower part of the welding nozzle, inserts 40 of a material capable of withstanding high temperatures without abrasion are welded into the grooves 38 of the nozzle, as shown in Fig. 5.

The welding nozzle is attached to the electrode-guiding arm 31 by means of a clamp 41 of high conductivity, and conductor 42, leading from a suitable generator of welding current (not shown), is attached thereto. The welding circuit is completed from the welding generator to the work 29 by conductor 43.

Control cable 44 for controlling the motor to rotate the feeding roller 25 may be connected to any suitable control mechanism. Since there are available and well known to those skilled in the art many mechanisms which may be used for controlling the operation of the motor for feeding the electrode 26, a detailed description of the control mechanism will not be set forth in this specification.

The operation of the above described apparatus is as follows:

The welding head is suitably positioned on a traveling carriage which is arranged to travel along the seam to be welded. The adjusting screw 34 is turned to increase the distance between the idler roller 30 and the feeding roller 25. The welding electrode 26 is fed manually, between the rollers 25 and 30, to the welding nozzle through the guiding bracket 45 located on the upper part of the electrode-guiding arm 31. Sufficient pressure is applied, by means of the adjusting screw 34, to move the idler roller 30 against the welding electrode 26 and the latter, in turn, against the feeding roller 25. This adjustment is such that when the feeding roller is caused to rotate, it will move the welding electrode in either a downward or an upward direction, depending upon the direction of rotation of the feeding roller.

A voltage from the welding generator is applied to the conductors 42 and 43. The feeding roller 25 is rotated to move the welding electrode 26 into contact with the work 29. When the welding current starts to flow, the welding electrode 26 is retracted by means of the feeding roller 25, and the arc 28 is maintained to perform the welding operation. As rapidly as the welding electrode 26 is consumed by the arc, it is fed thereto by feeding roller 25, and the welding head is moved along the work 29 for making a continuous weld.

It is often advantageous to feed the welding electrode 26 to the work at an angle rather than to feed it in a perpendicular direction. Angular feeding is readily accomplished by turning the welding head about its transverse axis by means of hand wheel 17, the shaft 16, its worm 15 and the worm-gear teeth 11, such gearing serving to maintain the welding head in any predetermined angular position.

For welding different thicknesses of material, it is necessary that electrodes of different diameters be used. These different electrodes are readily accommodated by changing the distance between the idler roller 30 and the feeding roller 25 by means of the adjusting screw 34.

In order to change the speed at which the welding electrode 26 is fed, it is necessary to use different sizes of feeding rollers. Thus, for slow speeds, a roller of relatively small diameter is used while, for higher speeds, a feeding roller of larger diameter is used. These various sizes of feeding rollers are readily accommodated by adjusting the electrode-guiding arm 31 by means of the adjusting screw 34, in accordance with the size of the roller used.

A straight-line relationship along the electrode between the welding head and the reel 27 is desirable to prevent excessive wearing of the parts with which the welding electrode 26 comes into contact. When welding electrodes and feeding rollers of different sizes are used, straight-line relationship is maintained by adjusting the position of the rotatable frame 18 by means of the hand wheel 21.

It is also desirable to maintain a straight-line relationship between the welding nozzle and that part of the periphery of the feeding roller 25 which is in contact with the welding electrode 26. This relationship is obtained by mounting the idler roller 30, the welding nozzle 35 and the guiding bracket 45 on the pivoted electrode-guiding arm 31.

In order to mount the welding head from the left-hand side rather than from the right-hand side, as shown in Fig. 1, the following adjustments are made:

The idler roller 30 is moved out of contact with the welding electrode 26, and the latter is withdrawn from the welding head. The bolts 33 are removed, and bracket 32 is removed, together with the attached electrode-guiding arm 31 and welding nozzle 35. The bracket 32 is reversed relative to the welding head, so that the welding nozzle 35 points in an upward direction, and it is reattached to the rotatable frame 18 by bolts 33. The entire welding head is turned about its longitudinal axis until the bearing 10 is positioned on the left hand side. The hand wheels 17 and 21, shafts 16 and 20 and worms 15 and 19 are removed and reassembled so that the hand wheels 17 and 21 may be operated from the top of the welding head.

It will be readily understood that the welding head may be mounted in any intermediate position between the right and the left-hand positions. Provision is thus made for making welds on work that is in a vertical or in a horizontal position or in any position between the vertical and the horizontal positions.

As may be readily appreciated by one skilled in the art, I have devised a welding head which is adaptable for a wide variety of welding conditions. Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. A welding head for feeding a welding electrode from a reel to perform a welding operation comprising, in combination, a feeding roller, a motor having driving connection with the feeding roller for effecting the rotation thereof, and guiding means, pivotally mounted on said welding head and disposed to cooperate with the feeding roller to maintain the welding electrode in substantially straight-line relationship.

2. A welding head for feeding a welding electrode from a reel to perform a welding operation comprising, in combination, a rotatable frame, a motor mounted within the rotatable frame, a feeding roller carried by said frame and disposed to be driven by the motor, and electrode-guiding means pivotally mounted on said frame and disposed to cooperate with the feeding roller to engage the electrode therebetween, said electrode-guiding means also being disposed to cooperate with the rotatable frame to maintain the welding electrode in substantially straight-line relationship to the reel.

3. A welding head for feeding a welding electrode to perform a welding operation comprising, in combination, a rotatable frame, a motor mounted within the rotatable frame, a feeding roller disposed to be driven by the motor, an electrode-guiding arm pivotally mounted on the rotatable frame, an idler roller carried by the electrode-guiding arm, said idler roller disposed to engage the electrode at a point substantially opposite from the point of engagement of the feeding roller with the electrode and to cooperate with the feeding roller, and a welding nozzle mounted on the electrode-guiding arm and comprising a plurality of copper bars having grooves therein and having inserts along the grooves to prevent abrasion of the nozzle by the welding electrode.

4. A welding head for feeding a welding electrode from a reel to perform a welding operation comprising, in combination, a rotatable frame, a motor mounted within the rotatable frame, a feeding roller disposed to be driven by the motor, an electrode-guiding arm pivotally mounted on the rotatable frame, an idler roller carried by the electrode-guiding arm, said idler roller disposed to engage the electrode at a point substantially opposite from the point of engagement of the feeding roller with the electrode and to cooperate with the feeding roller, means for adjusting the distance between the idler roller and the feeding roller to obtain suitable pressure between the roller and the welding electrode and to permit the use of welding electrodes and feeding rollers of different diameters, a welding nozzle mounted on the electrode-guiding arm to provide electrical contact with the welding electrode, and means for adjusting said rotatable frame to maintain a substantially straight-line relationship between the welding electrode and the reel.

5. A welding head for feeding a welding electrode from a reel to perform a welding operation comprising, in combination, a rotatable frame, a motor mounted within the rotatable frame, a feeding roller disposed to be driven by the motor, an electrode-guiding arm pivotally mounted on the rotatable frame, an idler roller carried by the electrode-guiding arm, said idler roller disposed to engage the electrode at a point substantially opposite from the point of engagement of the feeding roller with the electrode and to cooperate with the feeding roller, means for adjusting the distance between the idler roller and the feeding roller to obtain suitable pressure between the roller and the welding electrode and to permit the use of welding electrodes and feeding rollers of different diameters, a welding nozzle mounted on the electrode-guiding arm to provide for electrical contact with the welding electrode, said welding nozzle comprising a plurality of copper bars having grooves therein and having inserts along the grooves to prevent abrasion of the nozzle by the electrode, and means for adjusting said rotatable frame to maintain a substantially straight-line relationship between the welding electrode and the reel.

6. A welding head for feeding a welding electrode comprising, in combination, a rotatable frame, a motor mounted within the rotatable frame, a feeding roller carried by said frame and disposed to be driven by the motor, electrode-guiding means pivotally mounted on said frame and disposed to cooperate with the feeding roller, to engage the electrode therebetween, and a support for said rotatable frame, said support being disposed to cooperate with the rotatable frame to permit its mounting in a plurality of positions.

7. A welding head for feeding a welding electrode to perform a welding operation comprising, in combination, a frame arranged to be rotated about its longitudinal and transverse axes, a motor mounted within the frame, a feeding roller mounted on the frame and having driving connection with the motor, an electrode-guiding arm pivotally mounted on the frame to be operated upon by an adjusting member, an idler roller carried by the electrode-guiding arm and disposed to cooperate with the feeding roller to engage the electrode therebetween, and a welding nozzle mounted on the electrode-guiding arm for making electrical contact with the welding electrode.

8. A welding head for feeding a welding electrode to perform a welding operation comprising, in combination, a tilting ring pivotally mounted on a bearing, said bearing having teeth thereon, a worm disposed to be rotated by a handwheel for cooperation with teeth on the bearing to provide for movement of the tilting ring about its transverse axis, a rotatable frame mounted within said tilting ring and having teeth on its periphery, a worm for cooperation with the teeth on said rotatable frame to provide for its rotation about its longitudinal axis, an electric motor mounted within said rotatable frame, a train of gears disposed to be driven by said motor, a knurled feeding roller driven by the train of gears for feeding the welding electrode to the work to be welded, an electrode-guiding arm pivotally mounted on the rotatable frame, an idler roller carried by the electrode-guiding arm, said idler roller disposed to engage the electrode at a point substantially opposite from the point of engagement of the feeding roller with the electrode and to cooperate with the feeding roller, an adjusting screw for varying the distance between the idler roller and the feeding roller, thereby providing for the use of welding electrodes and feeding rollers of different diameters and for maintaining suitable pressure between the welding electrode and the feeding roller, and a welding nozzle mounted on the electrode-guiding arm comprising a plurality of copper bars having grooves therein for the welding electrode and having inserts of wear-resisting material along the grooves to prevent abrasion of the nozzle by the welding electrode.

9. A welding head for feeding a welding electrode to perform a welding operation comprising, in combination, a rotatable frame, a motor mounted within the rotatable frame, a feeding roller carried by said frame and disposed to be driven by the motor, an electrode-guiding arm pivotally mounted on the rotatable frame, and an idler roller carried by the electrode-guiding arm, said idler roller being disposed to engage the electrode at a point substantially opposite from the point of engagement of the feeding roller with the electrode and to cooperate with the feeding roller.

10. In a welding-electrode-feeding device, in combination, a frame, a motor carried by the frame, a feeding roller having driving connection with the motor, an electrode-guiding arm pivotally mounted on the frame, an idler roller carried by the electrode-guiding arm, said idler roller being disposed to engage the electrode at a point substantially opposite from the point of engagement of the feeding roller with the electrode, and a nozzle also carried by the electrode-guiding arm for directing the electrode to the work on which the welding operation is to be performed.

11. A welding head for feeding a welding electrode to perform a welding operation comprising, in combination, a frame disposed to be rotated about its longitudinal and transverse axes, a motor mounted within the frame, a feeding roller mounted on the frame and having driving connection with the motor, an electrode-guiding arm pivotally mounted on the frame and disposed to be operated upon by an adjusting member, and an idler roller carried by the electrode-guiding arm and disposed to cooperate with the feeding roller to engage the electrode therebetween.

12. In a welding head for feeding a welding electrode to perform a welding operation, in combination, a feeding roller, a motor for driving the feeding roller, a driving connection between the motor and the feeding roller, an idler roller disposed in cooperation relation with the feeding roller to engage the electrode therebetween, and means comprising a pair of rotatable frames for mounting the welding head in either a right or a left hand position.

13. A welding head adapted for mounting in either a right or a left hand position to feed a welding electrode for performing a welding operation comprising, in combination, a support member adaptable for mounting in either a right or a left hand position, a tilting member pivotally mounted on the support member, a frame rotatably mounted within the tilting member, a motor carried by the frame, a feeding roller mounted on the frame and having driving connection with the motor, an electrode-guiding arm pivotally mounted on the frame, and an idler roller carried by the electrode-guiding arm and disposed to cooperate with the feeding roller to engage the electrode therebetween.

14. A nozzle for guiding a welding electrode to perform a welding operation and to conduct current thereto comprising, in combination, elongated contact means constructed of a material having relatively high electrical conductivity and low abrasion resisting qualities and having a centrally located aperture extending longitudinally therethrough to provide for the passage of the welding electrode, and means comprising material having relatively high abrasion resisting qualities located along a portion of said aperture to prevent excessive abrasion of the nozzle by the welding electrode.

15. A nozzle for guiding a welding electrode to perform a welding operation and to conduct current thereto comprising, in combination, a pair of elongated contact members constructed of a material having relatively high electrical conductivity and low abrasion resisting qualities, each of said contact members being provided with a longitudinal groove to permit the passage of the electrode therebetween, and an insert located in each contact member along the groove near the end of the nozzle where the electrode emerges, said insert constructed of a material having relatively high abrasion resisting qualities to prevent excessive abrasion of the nozzle by the welding electrode.

16. A welding head for feeding a welding electrode to perform a welding operation comprising, in combination, a frame, a motor mounted within the frame, a feeding roller carried by the frame and having driving connection with the motor, and electrode-guiding means pivotally mounted on the frame to cooperate with the feeding roller for engaging the welding electrode therebetween.

17. A welding head for feeding a welding electrode to perform a welding operation comprising, in combination, a motor, mounting means for the motor to provide for the rotation thereof about a longitudinal and a transverse axis, a feeding roller carried by the motor and having driving connection therewith, and electrode guide means mounted in cooperative relation with the feeding roller for guiding the electrode to work on which the welding operation is to be performed.

GUSTAV H. KOCH.